UNITED STATES PATENT OFFICE.

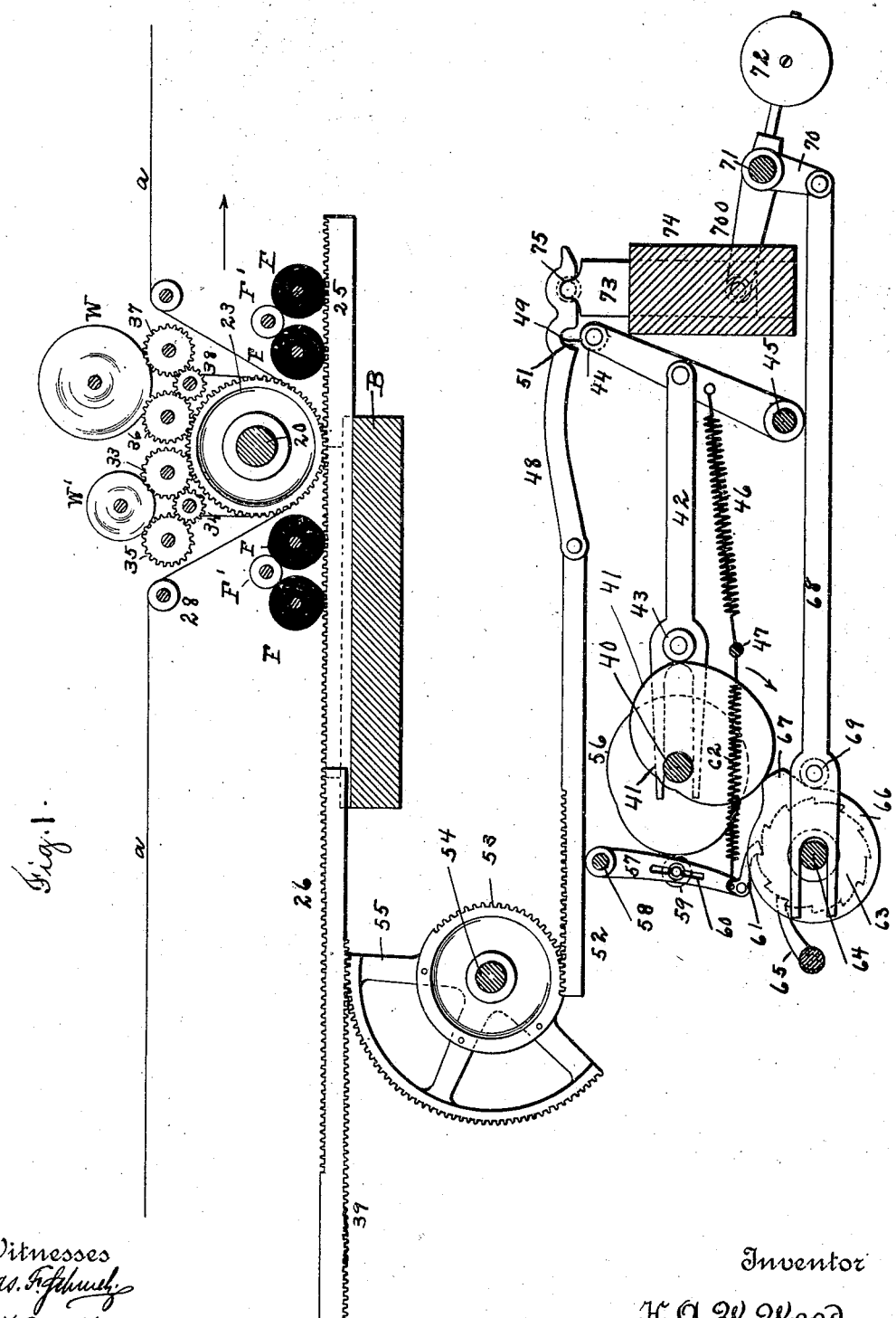

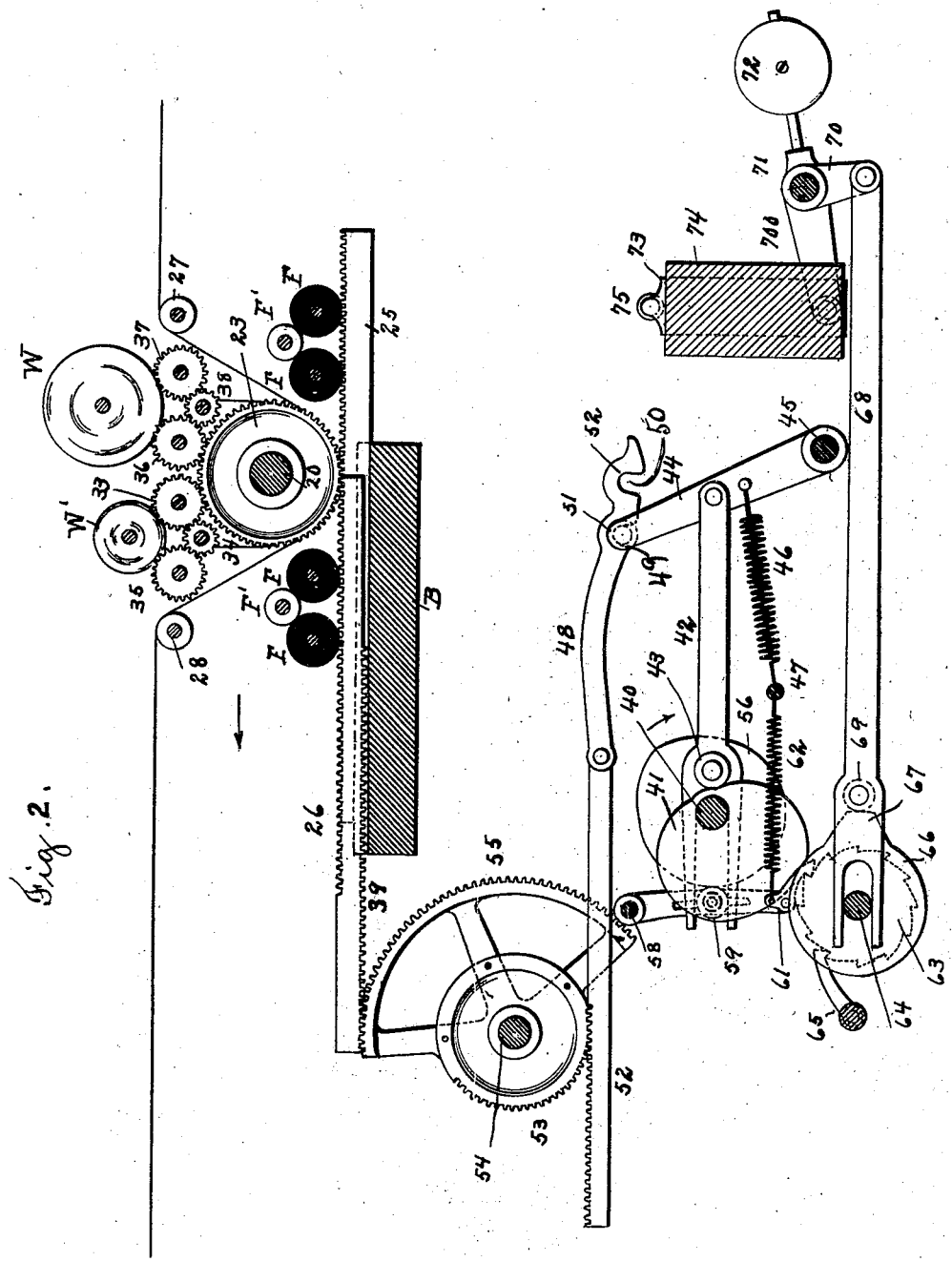

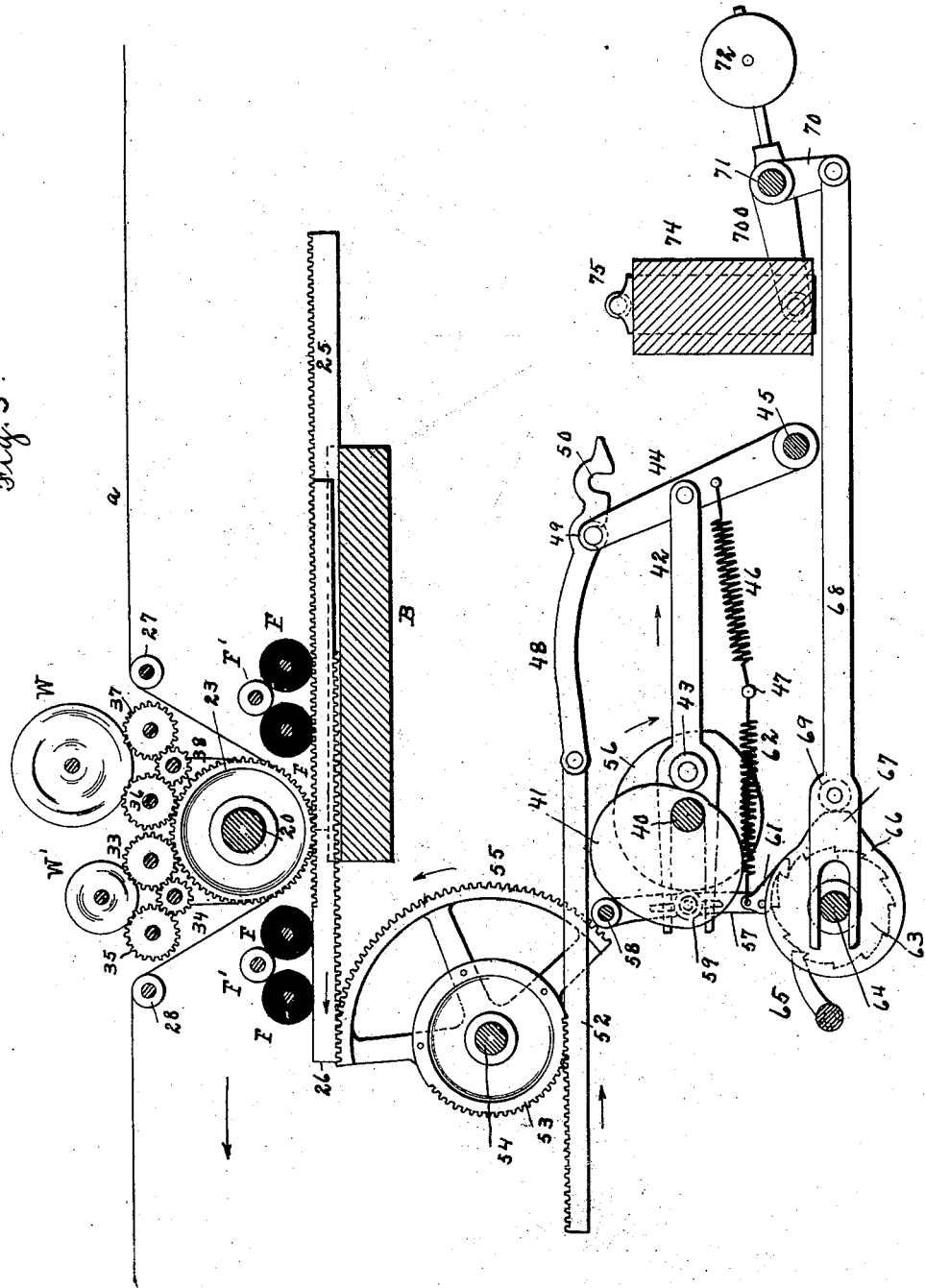

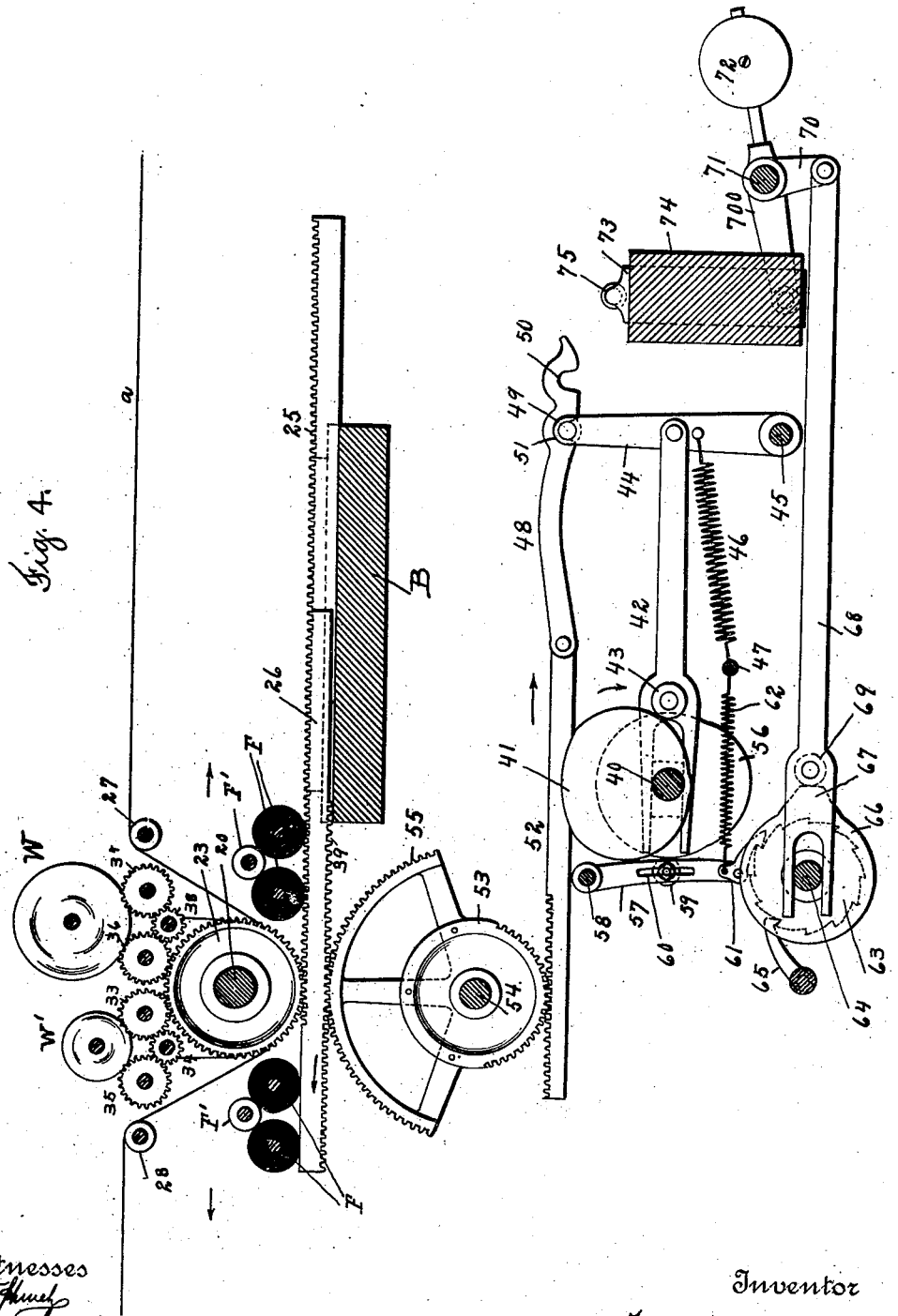

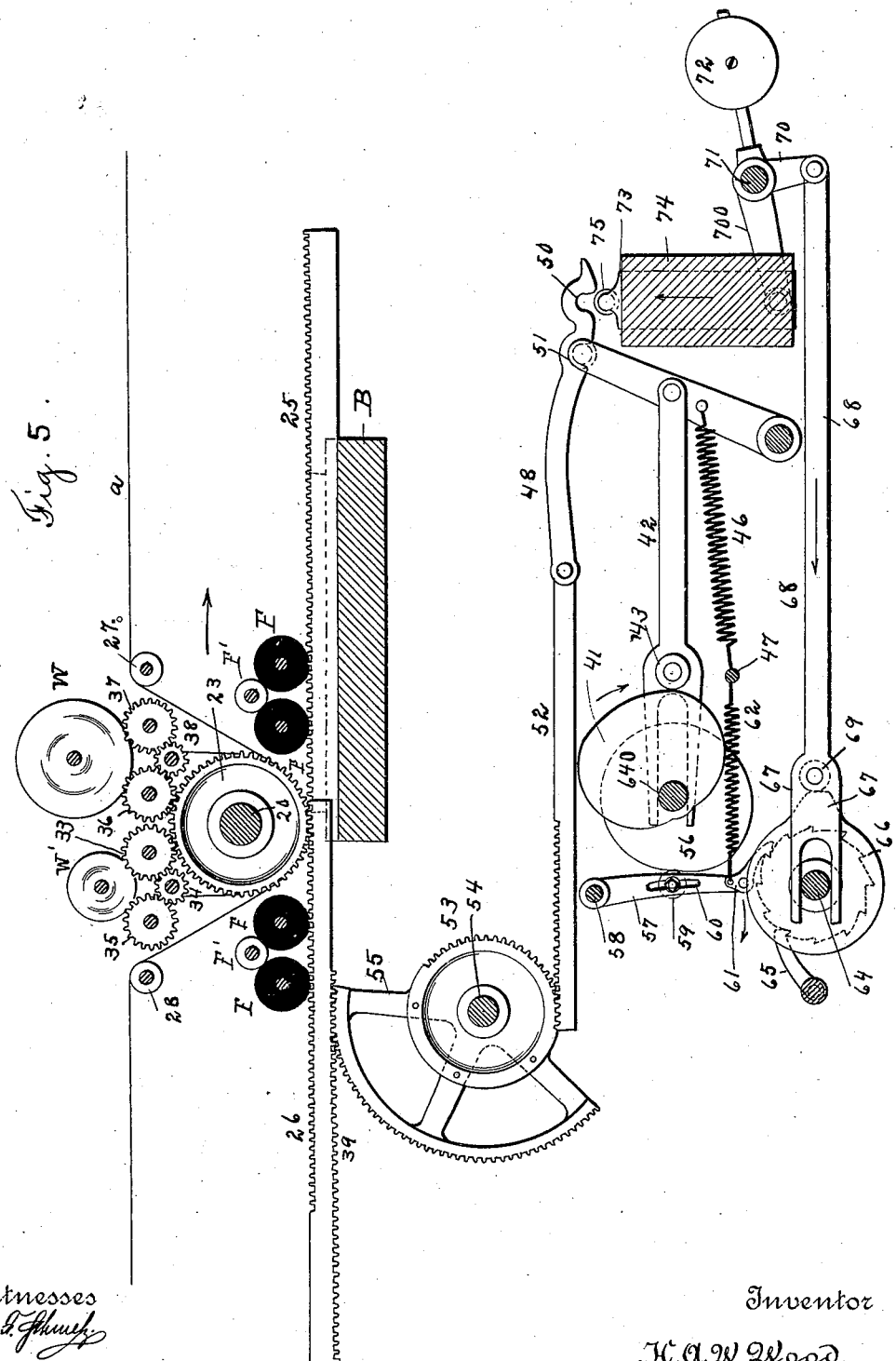

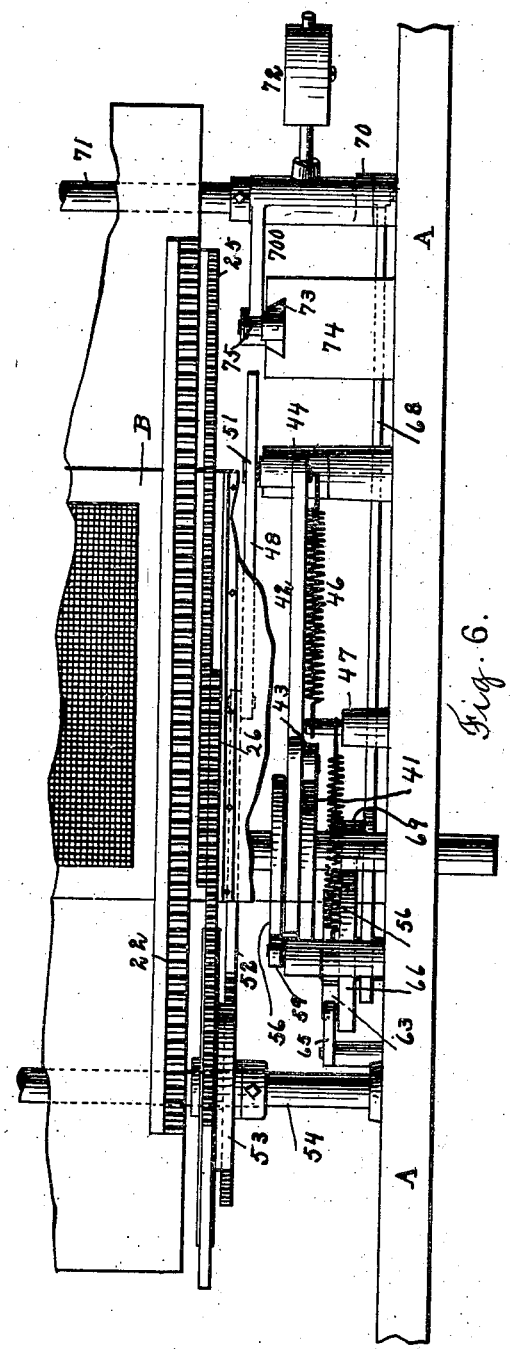
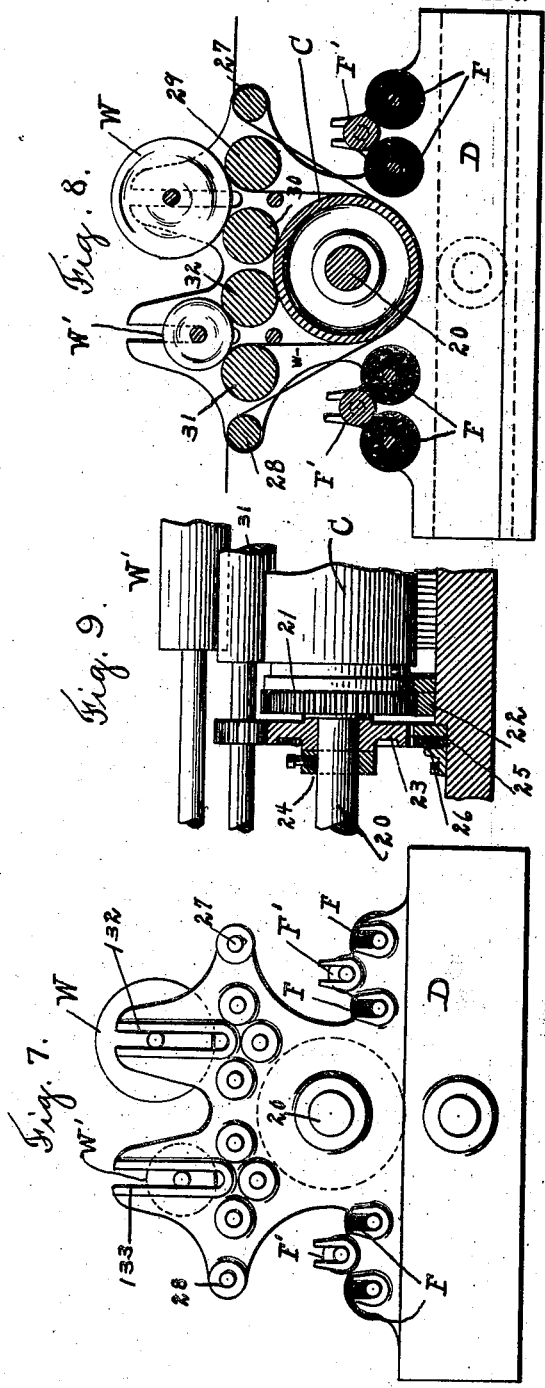

HENRY A. WISE WOOD, OF NEW YORK, N. Y., ASSIGNOR, BY MESNE ASSIGNMENTS, TO DETROIT TRUST CO., TRUSTEE, OF DETROIT, MICHIGAN.

PRINTING-MACHINE.

No. 896,187.      Specification of Letters Patent.      Patented Aug. 18, 1908.

Application filed August 30, 1894, Serial No. 521,683. Renewed January 3, 1907. Serial No. 350,555.

*To all whom it may concern:*

Be it known that I, HENRY A. WISE WOOD, a citizen of the United States, residing at New York, in the county of New York and State of New York, have invented a new and useful Improvement in Printing-Machines, of which the following is a specification.

The aim of this invention is to provide an anti-offset device for a traveling cylinder web press, such, for example, as is shown in Letters-Patent No. 376,053, granted to John H. Stonemetz January 3, 1888, or No. 478,503, granted to J. L. Cox, July 5, 1892.

To this end, my invention consists of the mechanism described and claimed in this specification, and illustrated in the accompanying drawings, in which, Figure 1 is a sectional elevation of enough of a printing machine of the character referred to to illustrate how my improved mechanism may be applied thereto, Figs. 2, 3, 4 and 5 are similar sectional elevations showing the various positions that the parts assume in operation, Fig. 6 is a sectional plan view of the offset web-manipulating mechanism, Fig. 7 is a side elevation of one of the carriers, Fig. 8 is a section just inside one of the carriers, and Fig. 9 is a fractional end elevation of part of the cylinder and adjacent mechanism.

In traveling cylinder web presses of the class referred to, the second impression cylinder comes in contact with the first printed side of the web, and as the impression is made by the second impression cylinder, ink from the first impression on the web is apt to set off onto the surface of the second impression cylinder, and from the surface of the second impression cylinder to be transferred to a succeeding portion of the web, thereby blurring the product. The aim of my invention is to remedy this offset.

My invention consists in providing an offset web for said cylinder, and in providing means so that said off-set web will be shifted automatically to bring a fresh portion thereof to protect the surface of the cylinder: said shifting action being arranged to take place as the cylinder reverses its movement clear of the forms or printing surfaces. This shifting action is also preferably arranged to take place only as the cylinder reverses its movement at one end of its stroke, and only at intervals of a number of impressions.

My invention also consists of means whereby the entire offset web may be bodily carried to and fro with and outside of the second impression cylinder, the offset web moving with the periphery of said cylinder and whereby the offset web may be carried about the second impression cylinder to prevent contact between the same and the web to be printed, and also in combination with the above, of means whereby the offset web may be automatically respaced around the second impression cylinder so that a new surface of the same will be brought between the second impression cylinder and the web to be printed, at intervals of a number of impressions.

Referring to the drawings and in detail, B represents the form bed of a press of this class.

C represents the coacting traveling impression cylinder, which is mounted in a suitable carriage, which may consist of the carriers D arranged to move suitable guides parallel to the bed B. This arrangement is well known, and may be of any of the preferred types. Also mounted in the carriers are form-inking rollers F, F, and the distributing rollers F¹ by which ink may be laid on the forms placed on the bed.

20 represents the shaft on which the impression cylinder is mounted, this shaft 20 being journaled in the carriers D. On the shaft 20, close to the impression cylinder C, I mount a gear 21, which meshes with a stationary rack 22 mounted at the side of the bed in the usual manner so that as the cylinder reciprocates, the same will be revolved, and will register with the forms. Loosely mounted on the shaft 20 beside the gear 21, and between the same and a collar 24 is a gear 23. This gear 23 meshes with a rack 25 which is secured to the side of the bed, and also with a movable rack 26, which is mounted in suitable guides parallel with the rack 25. The two racks 25 and 26 are each of about half the face of the gear 23, so that the gear 23 will mesh with them both, as shown in Fig. 9.

Mounted in the carriers D are the usual web guide rollers 27 and 28, which lead the web to be printed down to and up from the impression cylinder C. Mounted in the carriers are two rollers 29 and 30 on which the offset web-roll W may be placed, and also mounted in the carriers are two rollers 31 and 32, which serve as rewinding rollers so that the web led from the roll W may be wound up onto a second roll W¹, as indicated in Fig. 8.

On the roller 30 is arranged a pinion 36, which meshes with gear 23 of the impression cylinder C, and by means of intermediate 38 and gear 37 on the roller 29, the roller 29 will also be driven from the cylinder-gear 23. Similar gearing 33, 34 and 35 is used to turn the rollers 31 and 32.

The carriers D have suitable guides 132 and 133 formed in the same so that the shafts of the web-rolls W and W¹ may be dropped in the same, whereby the web-rolls will be kept in place, and the peripheries of the web-rolls will rest upon and will be driven from their respective rollers. The web from the web-roll W is led down over the roller 29, under the impression cylinder C, thereby preventing contact of the web $a$ with the same, and is then led from the impression cylinder C up around the roller 31, to be wound up in the second roll W¹. By the means thus described, it will be seen that as the impression cylinder is reciprocated back and forth, the rollers 29, 30, 31 and 32 will turn at substantially the same peripheral speed as the impression cylinder, and the offset web $w$, will travel with the periphery of the impression cylinder; that is, as the impression cylinder is reciprocated back and forth, the offset web $w$ will run with the movement of the cylinder, so that as the cylinder moves in one direction, the offset web will run from the roll W to the roll W¹, and, as the cylinder moves in the opposite direction, the offset web will run from the roll W¹ back to the roll W. This will prevent contact of the web to be printed with the impression cylinder, but will oppose no resistance to the movement of the impression cylinder in the web to be printed. This will effectually prevent offset. But, after a number of impressions have been made in this manner, the offset web will become blurred, and it is necessary to shift the same so that a fresh portion of the offset web will be around the impression cylinder. To accomplish this, I use this mechanism.

40 represents a driving shaft, which makes one turn for each complete forward and backward movement of the impression cylinder. Mounted on this shaft is a cam 41, and engaging the shaft is a yoke 42, which carries a roll 43, which bears on the periphery of the cam 41. The yoke 42 connects to a vibrating arm 44, which is mounted upon a stud 45. A spring 46 is arranged between the arm 44 and a stationary point 47, and serves to keep the roller 43 in constant engagement with the cam 41. The arm 44 has a stud or roller 49 arranged in the end of the same, which stud is adapted to engage a notch 51 cut in a link 48. The link 48 connects to a suitable sliding rack 52, which rack engages a sector 53 mounted on a shaft 54, and also arranged on the shaft 54 is a sector 55, which engages a rack 39, cut on the bottom of the sliding rack 26. Also mounted on the shaft 40 is a cam 56.

57 represents a swinging lever which is mounted on a stud 58, and which carries an adjustable roller 59 bearing upon the periphery of the cam 56. The roller 59 is adjustable in a slot 60 cut in the arm 57. The swinging arm or lever 57 carries at the end thereof a pawl 61, and a suitable spring 62 is arranged between this pawl and the stationary point 47, and serves to normally keep the pawl in one position, and also to keep the roller 59 against the cam 56. The pawl 61 is adapted to engage a ratchet-wheel 63 mounted upon a shaft 64, and a safety pawl 65 is used to keep the ratchet-wheel in one position. Also mounted upon the shaft 64 is a cam 66, which has a projection 67. A suitable yoke 68 engages the shaft 64, and has a roller 69 which engages the cam 66. This yoke 68 connects to one arm 70 of a bell-crank lever mounted upon a stud 71, and the other arm 700 connects to a sliding frame 73, which is mounted in suitable guides 74, and carries a roller 75, which is adapted to engage a notch 50 cut in the end of the link 48. A suitable weight 72 is arranged on the bell-crank lever, as shown, and serves to keep the roller 69 normally in contact with the cam 66, and the roll 75 thus raised.

The number of teeth in the ratchet-wheel 63 will determine the number of imprints that are made between each shift of the offset web, and by using different sized ratchet-wheels, or by using a fine toothed ratchet-wheel, and adjusting the roller 59, the number of imprints between each shift of the offset web can be varied.

The operation of this offset web-shifting mechanism is as follows:—The parts are shown in normal position in Fig. 1. In this position, the roller 75 has engaged the link 48, and lifted the same clear of the vibrating arm 44. This will hold the rack 26 in the position shown, and as the shaft 40 revolves, the arm 44 will be vibrated idly backwards and forwards, and the cam 66 will be slowly turned by means of the ratchet-and-pawl mechanism. Suppose now that the cam is turned so that the projection 67 will bear on the roller 69, and lower the roller 75. The parts are so timed that as this takes place, the link 48 will drop and engage the roller 49 of the vibrating arm 44. The rack 52 will then be pushed to the left, and the rack 26 to the right. The movements of the impression cylinder should be so timed that the movement of the rack 26 to the right will take place when the impression cylinder is reversing in its right hand position, and clear of the rack 26. The parts will then be brought to assume the position shown in Fig. 2, as the impression cylinder moves to the left. As the impression cylinder continues its movement to the left, the gear 23 will engage the rack 26, as shown in Fig. 2, said rack remaining stationary as the cylinder prints; but as the cylinder continues its movement to the left, and reverses at the left hand end of the stroke, the rack 52 will be moved to the right, and the rack 26 thereby to the left, and this movement of the rack is so timed that the same will take place when the gear 23 is not in engagement with the stationary rack 25, or the impression cylinder in printing contact with the forms. This movement is shown as commencing in Fig. 3, half completed in Fig. 4, and completed in Fig. 5. This movement also takes place just as the gear 23 clears the stationary rack 25, and is finished just before the gear 23 engages said stationary rack 25. As the cylinder continues its movement to the right, and when the gear 23 and the rack 26 are disengaged, the frame 73 will rise, and will lift the link 48 clear of the arm 44, and will bring the parts to their normal position, as shown in Fig. 1.

The movement of the rack 26 to the left, while in engagement with the gear 23, will give the web-rolls W and W' an independent movement, and will respace the off-set web, that is, will unwind the same from the roll W, and wind the same up on roll W', and bring a fresh portion thereof about the impression cylinder. Obviously this shifting only takes place when the guide 73 is lowered so that the link 48 will engage the arm 44, and hence the shift of the offset web will only take place at intervals of a number of impressions. Therefore it will be seen that I have provided a neat and efficient mechanism for this new purpose.

It is a very desirable arrangement to shift the off-set web around the surface of the impression cylinder as the cylinder reverses its movement clear of the forms or printing surface. It is moreover a very desirable construction to have this shifting action take place when the cylinder reverses its movement at one end only of its stroke; thus, for example: the shifting action is described as always taking place when the cylinder reverses at the left hand end of its movement, as shown in the drawing.

The web to be printed $a$ is shown as passing down to the cylinder over the guide 27, up from the cylinder over the guide 28. The feed movement of this web $a$ will therefore take place in the same direction as the shift of the off-set web, and at the same time; therefore, the two webs will substantially move in unison at the shifting operation of the off-set web.

If desirable, the web can be shifted after every full excursion of the impression cylinder, by disconnecting the pawl 61 and permitting the projection 67 to remain against roller 69 thereby holding the guide 73 down.

After all the web is drawn from the roll W, and is wound up on the roll W', the roll W' may be placed in the guides 132, and the web then used over again, as before described.

It is within the scope of my invention, to mount the two web rolls W or W' within the impression cylinder, instead of outside as shown, or any arrangement, whereby the web will be shifted only as the impression cylinder reverses clear of the forms may be used, but I prefer the arrangement shown, as it enables me to use small impression cylinders and thus light moving parts.

The mechanism herein described for shifting the web may be changed by a skilled mechanic without departing from the scope of my invention, which is, broadly speaking, carrying the entire offset web with and outside of the impression cylinder, and automatically shifting the same at the particular time described and preferably at intervals of a number of impressions.

Having thus fully described my invention, what I claim and desire to secure by Letters-Patent is:—

1. The combination in a traveling cylinder web-perfecting printing press, of the second impression cylinder and bed, guides for leading the web to be printed around said cylinder, an offset web interposed between the web to be printed and said cylinder, and means moving with said cylinder for automatically shifting said web in the same direction that the web to be printed is shifted when the impression cylinder is reversing out of printing contact with the forms.

2. The combination in a traveling cylinder web-perfecting printing press, of the second impression cylinder and bed, guides for leading the web to be printed around said cylinder, an offset web interposed between the web to be printed and said cylinder, and means moving with said cylinder for automatically shifting said offset web in the same direction that the web to be printed is shifted when the impression cylinder is reversing out of printing contact with the forms and at intervals of a number of impressions.

3. The combination in a traveling cylinder web perfecting press, of the second impression cylinder and bed, guides for leading the web to be printed around said cylinder, an offset web interposed between the web to be printed and said cylinder, and means moving with said cylinder for automatically shifting said offset web in the same direction that the web to be printed is shifted, arranged so that the shifting action takes place as the cylinder reverses its movement off the bed at one end of its stroke.

4. The combination in a traveling cylinder web perfecting press of the second impression cylinder and bed, guides for leading the web to be printed around said cylinder, an offset web interposed between the web to be printed and said cylinder, and means moving with said cylinder for automatically shifting said offset web in the same direction that the web to be printed is shifted, arranged so that the shifting action takes place as the cylinder reverses its movement at one end of its stroke, at intervals of a number of impressions.

5. The combination in a traveling cylinder press of a stationary form bed, reciprocating carriers, an impression cylinder mounted in said carriers to coöperate with said form bed, an offset web mounted in said carriers outside of said impression cylinder, said offset web being led around said impression cylinder, and means for moving the offset web so that the same will run around the periphery of the impression cylinder in harmony with the peripheral movement thereof.

6. The combination in a traveling cylinder web press of a stationary form bed, reciprocating carriers, an impression cylinder mounted in said carriers, an offset web mounted in said carriers outside of the impression cylinder, and so as to move with the carriers, said offset web being led around the impression cylinder, and means for shifting the offset web at intervals of a number of impressions.

7. The combination in a traveling cylinder web press of a stationary form bed, reciprocating carriers, an impression cylinder mounted in said carriers, an offset web mounted in said carriers outside of the impression cylinder, and moving bodily therewith, means whereby the offset web will be moved back and forth in harmony with the periphery of the traveling impression cylinder as the same is moved, and means for shifting or respacing the offset web at intervals of a number of impressions.

8. The combination in a traveling cylinder web press of a stationary form bed, a traveling impression cylinder coacting therewith, an offset web bodily traveling with the impression cylinder in the form of two web-rolls, means for unwinding and winding up the offset web so that the same will move in harmony with the peripheral speed of the traveling impression cylinder, and means for respacing the offset web.

9. The combination in a traveling cylinder web press of a stationary form bed, a traveling impression cylinder coacting therewith, means whereby two web-rolls may be carried with the traveling impression cylinder, whereby an offset web may be carried bodily with the traveling impression cylinder, gearing whereby the two web-rolls will be turned so as to wind and unwind the offset web, so that the same will move in harmony with the rotation of the traveling impression cylinder, and means for respacing the offset web.

10. The combination in a traveling cylinder web press of a stationary form bed, a traveling impression cylinder coacting therewith, means whereby two web rolls may be carried with the impression cylinder, so that an offset web may move bodily with the traveling impression cylinder, means for winding and unwinding the web rolls, so that the offset web will move in harmony with the periphery of the traveling impression cylinder, and means for unwinding the web from one roll, and winding the same up on the other, so that the web will be respaced at intervals of a number of impressions.

11. The combination in a traveling cylinder web press of a stationary form bed, a traveling carriage carrying an impression cylinder coacting with the bed B, rolls as 29, 30, 31 and 32, and suitable means whereby two web-rolls may be mounted in the carriage, whereby an offset web can be led around the impression cylinder, a gear loose on the cylinder shaft, and gearing from the same to turn said rolls, a stationary rack 25, and a sliding rack 26, which engage the gear on the cylinder shaft, and means for shifting the sliding rack at intervals of a number of impressions, whereby the offset web may be respaced.

12. The combination in a traveling cylinder web press of a stationary form bed, a traveling carriage carrying an impression cylinder coacting therewith, two web-rolls mounted in said carriage whereby an offset web may be led around the impression cylinder, a gear loosely mounted on the cylinder shaft, and gearing whereby the web-rolls will be turned so that the offset web will move in harmony with the periphery of the impression cylinder, a stationary and a sliding rack engaging said gear, means for holding the sliding rack in one position, and means for moving the sliding rack back and forth in engagement with a gear on the cylinder shaft, whereby the offset web may be respaced at intervals of a number of impressions.

13. The combination in a traveling cylinder web press, of the stationary form bed, a traveling impression cylinder coacting therewith, an offset web carried with the impression cylinder as described, and means for intermittently respacing said offset web, comprising a rocking pivoted arm as 44, a link adapted to engage said arm, connections from said link to shift said offset web, and means whereby said pivoted arm and link will be engaged and disengaged.

14. The combination in a traveling cylinder web press of a stationary form bed, a traveling impression cylinder carried therewith, an offset web moving with the traveling impression cylinder, a rocking, pivoted arm, as 44, a link 48 adapted to engage said arm, connections from said link to respace the offset web, a bracket 73 and roller 75 for normally holding the link 48 out of engagement from the rocking arm 44, and for allowing the same to be engaged at intervals of a number of impressions, whereby the offset web may be respaced.

15. The combination in a traveling cylinder web press of a stationary form bed, a traveling impression cylinder coacting therewith, an offset web bodily moving with the impression cylinder, and means for respacing said offset web, comprising a pivoted, rocking arm, a link adapted to engage said arm, connections from said link to shift the web, a sliding bracket 73, a roll 75 for lifting the link clear of the rocking arm, and means for actuating said bracket 73.

In testimony whereof I have hereunto set my hand, in the presence of two subscribing witnesses.

H. A. WISE WOOD.

Witnesses:
 A. M. CANTELL,
 WILLIAM F. KIMBER.